United States Patent [19]

Miyazawa et al.

[11] Patent Number: 4,942,417
[45] Date of Patent: Jul. 17, 1990

[54] POWERED ZOOM CAMERA

[75] Inventors: Azuma Miyazawa, Mitaka; Atsushi Maruyama, Yokohama, both of Japan

[73] Assignee: Olympus Optical Co., Ltd., Japan

[21] Appl. No.: 370,631

[22] Filed: Jun. 23, 1989

[30] Foreign Application Priority Data

Jun. 24, 1988 [JP] Japan .................. 63-157454

[51] Int. Cl.⁵ .................. G03B 13/36
[52] U.S. Cl. .................. 354/400; 354/81; 354/195.1
[58] Field of Search .......... 354/400, 195.1, 81

[56] References Cited

U.S. PATENT DOCUMENTS

| | | | |
|---|---|---|---|
| 3,314,350 | 4/1967 | Husum | 354/195.1 |
| 4,145,732 | 3/1979 | Pandres, Jr. | |
| 4,156,933 | 5/1979 | Pandres, Jr. | |
| 4,719,485 | 1/1988 | Shikaumi | 354/81 |

FOREIGN PATENT DOCUMENTS

| | | |
|---|---|---|
| 0027577 | 8/1976 | Japan . |
| 0251729 | 11/1987 | Japan . |
| 0220118 | 9/1988 | Japan . |
| 0481389 | 9/1968 | Switzerland . |

Primary Examiner—Russell E. Adams
Attorney, Agent, or Firm—Louis Weinstein

[57] ABSTRACT

In a powered zoom camera, the ratio of the dimension of an object image to a photographic frame is selected by a low speed manual zooming. A photographic magnification at this time is stored. In an automatic zoom mode, the camera is automatically zoomed to obtain the stored photographing magnification even if the object moves. The same photographing magnification may be obtained in both vertical and horizontal positions.

24 Claims, 10 Drawing Sheets

POWERED ZOOM CAMERA

BACKGROUND OF THE INVENTION

The present invention relates to a powered zoom camera, and in particular to a powered zoom camera in which the ratio of the dimension of the image of a main object on a focal plane to the dimension of a frame can be automatically kept constant merely by tracking the object.

Although several ratios of the dimension of the image of a person on a focal plane to the dimension of a photographic frame will suffice when a photographer takes a portrait by using a zoom lens, he or she changes the zoom position by manipulating a zoom ring with the fingers or by pressing zoom buttons every time. If a moving object is photographed, for example, if a sliding form or a person skiing is photographed, it is very hard work to track with a zoom lens the object which approaches toward or moves away from the photographer at high speed.

A camera having an automatic zooming function in which the ratio of the size of the image of a person on a focal plane to the size of a photographic frame can be preliminarily preset by a photographer has been proposed in the Japanese Laid-Open Patent Applications Nos. Sho/62-95959 and Sho/63-220118 by the present assignee.

Such a powered zoom camera enables a photographer to take a desired picture only by moves away an object without paying attention to zoom operation. Since the zooming speed in the automatic zoom mode is the same as that in the manual zoom mode and since zooming can not follow a fast moving object, there is a possibility of losing a shutter chance. That is, zooming speed can be increased to any high speed since zooming should only be conducted until the preliminarily preset ratio of the size of the image of an object on a focal plane to the size of the frame is obtained. In the proposed powered zoom camera, the zooming speed is not changed. Accordingly, the zooming speed in the automatic zoom mode is as slow as that in the manual zoom mode.

Although it is necessary to appropriately change the ratio of the dimension of an object image on a focal plane to the dimension of the frame in the automatic zoom mode, manual zoom operation by manual zoom switches are not necessary in the automatic zoom mode. Accordingly it is preferable that the manual zoom switches be used as a means for changing the ratio of the dimension of an object to that of a frame.

SUMMARY OF THE INVENTION

It is an object of the present invention to provide a powered zoom camera in which zooming is conducted at high and low speeds and in automatic and manual zoom modes respectively.

It is another object of the present invention to provide a powered zoom camera in which the ratio of the dimension of an object image to that of a frame can be appropriately changed and preset by means of a manual zoom switch in an automatic zoom mode.

It is a further object of the present invention to provide a powered zoom camera in which the ratio of the dimension of an object image to that of a frame is automatically preset depending upon the position of a camera.

It is a further object of the present invention to provide a powered zoom camera in which the focal length of a zoom lens is not changed in relation to a slowly moving object.

It is a further object of the present invention to provide a powered zoom camera in which the focal length of a zoom lens is changed in relation to only an approaching object.

In an aspect of the present invention, there is provided a powered zoom camera comprising mode selecting means for selecting any one of a manual zoom mode in which the focal length of a zoom lens is manually selected by the actuation of an actuation member disposed along the exterior surface of the camera and an automatic zoom mode in which a magnification of the size of the image of an object to be photographed on a focal plane with respect to the size of a frame is kept constant in response to a distance or range between the object and the camera lens; and lens drive control means for operating the zoom lens at a low speed when the manual zoom mode is selected and for operating the zoom lens at a high speed when the automatic zoom mode is selected.

In another aspect of the present invention, there is provided a powered zoom camera comprising an actuating means disposed along and accessible from the exterior of the camera; means for presetting a desired magnification of the size of the image of an object to be photographed on a focal plane with respect to the size of a photographic frame; and mode selecting means for selecting any one of a manual zoom mode in which the focal length of a zoom lens is manually selected by the actuation of an outer actuation member and an automatic zoom mode in which a magnification of the size of the image of an object to be photographed on a focal plane with respect to the size of a photographic frame is kept constant in response to a distance between the object and the camera lens, whereby the camera is brought into the manual zoom mode on actuation of the actuating member while the automatic zoom mode is selected and the magnification r is preset in accordance with the focal length of a zoom lens at the time when the actuating member is released.

In a further aspect of the present invention to provide a powered zoom camera having a constant magnification photographing function in which a zoom lens is driven to a predetermined focal length prior to photographing including means for measuring the distance between an object to be photographed and a camera lens; a zoom lens, the focal length of which can be changed by an electric motor; and means for determining the focal length of a zoom lens at which the desired magnification may be obtained upon basis of the information on distance or range between the object and the camera lens, measured by the range finding means, characterized in that said focal length determining means has two magnification determining processes; and a magnification which is suitable for the camera position is automatically preset by detecting the camera position by camera position determining means incorporated in the camera and by selecting one of the magnification determining processes.

In a further aspect of the present invention, there is provided a powered zoom camera having a constant magnification photographing function including a range finding means for measuring the object distance, a zoom lens, the focal length of which can be changed by an electric motor, focal length presetting means for determining the focal length of the zoom lens at which a constant magnification is obtained from information of the object distance, which is obtained from the range finding means, and drive means for driving the zoom lens to provide the determined focal length prior to photographing, comprising; means for detecting and outputting the current preset focal length; determining means for comparing the output value of the focal length determining means and the current focal length and determining whether or not the difference therebetween exceeds a given value; and bypass means for omitting the driving of the zoom lens by the driving means when the difference is not greater than the given value by said determining means.

In a further aspect of the present invention, there is provided a powered zoom camera having a constant magnification photographing function including range finding means for measuring the object distance, a zoom lens, the focal length of which can be changed by an electric motor, focal length presetting means for determining the focal length of the zoom lens at which a constant magnification is obtained from information of object distance, which is obtained from the range finding means, and drive means for driving the zoom lens to provide the determined focal length prior to photographing, comprising; a process for remeasuring the distance after the driving of the zoom lens by the driving means has been completed; and a process for comparing the second measurement with the initial measurement and for updating the measured distance data only when the second measurement is smaller than the initial measurement.

BRIEF DESCRIPTION OF THE DRAWINGS

The above and other objects and features of the present invention will become apparent by reading the following description with reference to the drawings in which.

DETAILED DESCRIPTION OF PREFERRED EMBODIMENTS:

The photographing magnification of an object to be photographed onto a film will be explained prior to the description of the preferred embodiments of the Invention.

Figure 1:
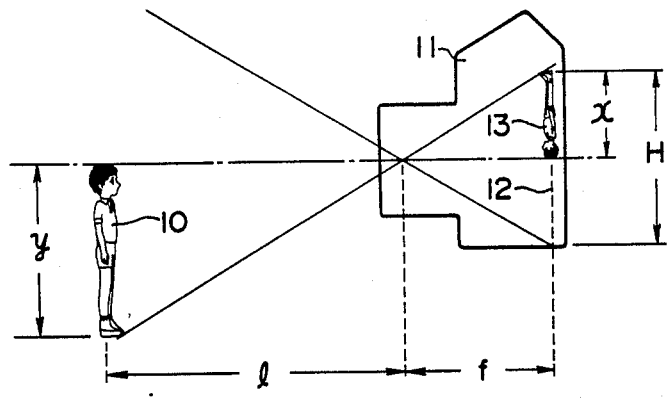
FIG. 1 is an elevational view showing the relation between a camera and an object to be photographed for explaining a photographing magnification of the dimension of an object image with respect to the dimension of a photographic frame.

The magnification is uniquely determined by an object distance l and a focal length f of an objective lens. As shown in FIG. 1, the height of a person 10 is represented by y. The height of the image 13 of the person on a film surface 12 of a camera 11 is represented by x. The magnification is represented by x/y=M. The following formula (1) is established.

$$f = (x/y) \cdot l = M \cdot l \tag{1}$$

Since the length y of the person 10 is constant, the focal length f should be changed in proportion to the object distance l if a constant height of the image 13 of the person on a focal plane or film surface is desired.

The ratio of the dimension of the image of the object on a focal plane to the vertical dimension of a frame is represented by R.

$$r = x/H = M \cdot y/H \tag{2}$$

wherein H is a height of a film frame as shown in FIG. 1. Specifically H is 24 mm for 35 mm film.

From (2), we obtain $$M = r \cdot H/y \tag{2'}$$

When substituting r for (1), we obtain $$f = r \cdot H \cdot l/y$$

Therefore, if it is desired that the image of a body of a person (r=x/H=0.5) always occupy one-half of the film frame even when he or she approaches moves away from the camera, the focal length f of the zoom lens should be changed in proportion to the object distance l (this zooming operation will be hereinafter referred to as automatic zooming or automatic zoom mode) after the image of a half body of the person in a frame can be viewed through a finder.

It is apparent from formula (2)' that a constant magnification M should be kept in order to keep a constant ratio r of the dimension of the image of an object x on a film to the dimension of a frame H.

For simplicity of the description, the ratio r of the dimension of the image of an object on a focal plane or film x to the dimension of a frame H will be hereinafter referred to as photographing magnification.

The present invention will now described with reference to drawings.

Figure 2:
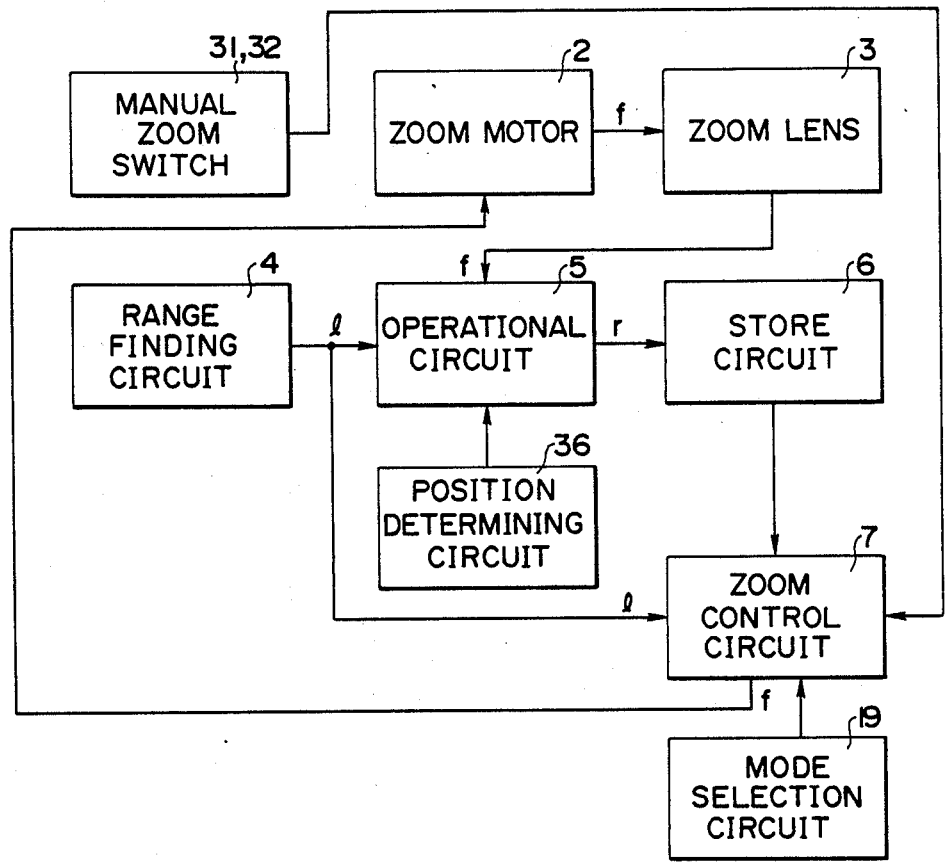
FIG. 2 is a block diagram showing a basic structure of a powered zoom camera of the present invention.

Referring now to FIG. 2, there is shown the basic structure of a powered zoom camera of the present invention.

When a mode selection circuit 19 selects a manual zoom mode, a zoom motor 2 is driven via a zoom control circuit 7 by manual zoom switches 31 and 32 (see FIG. 3) to change the focal length f of a zoom lens.

When the mode selection switch 19 selects an automatic zoom mode 1, a focal length f is determined by means of zoom control means 7 in accordance with a distance l between an object to be photographed and a camera lens, measured by a range finding circuit 4 and a photographing magnification r of the size of the object image on a focal plane with respect to the size of a photographic frame (actually, the magnification M=f/l corresponding to this r), which is in advance stored in the store circuit 6. The zoom motor 2 is driven until the zoom lens has reached the above-mentioned focal length f.

Figure 3:
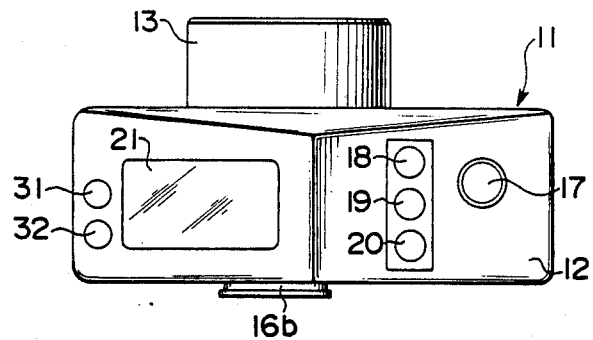
FIG. 3 is a top plan view showing an embodiment of a powered zoom camera of the present invention.
Figure 4:
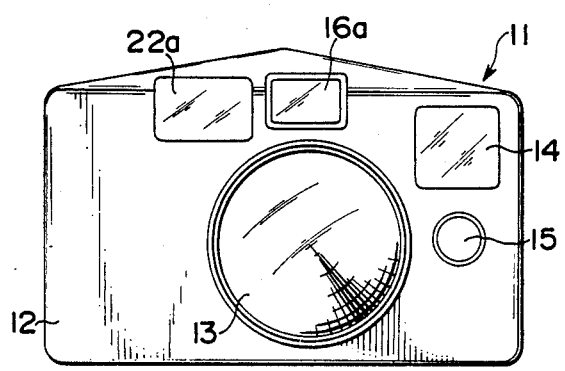
FIG. 4 is a front elevational view showing an embodiment of a powered zoom camera of the present invention.

Referring now to FIGS. 3 and 4, there is shown a powered zoom camera 11. A powered zoom lens barrel 13 is mounted on the front face of a main body 12 of the camera 11. An electronic flash 14 and a light emitting element 15 for alarming a self mode are provided in the vicinity of the side of the barrel 13. The main body 12 of the camera is provided with an AF (autofocussing) range finding window 22a and a finder objective window 16a which are arranged at the upper and central part thereof. A shutter release button 17 and push button type change-over switches 18, 19 and 20 are disposed on the upper side of the camera main body 12 at positions where they can be operated while looking into a finder eye piece window 16b on the rear side of the camera. The switch 18 is a change-over switch for presetting the self-mode, the switch 19 is a change-over switch for change the photographing mode into one of the manual zoom mode and automatic zoom mode. The switch 20 is a switch for changing the flash light emission into one of automatic flash light emission, light emission prohibition and forced light emission. A liquid crystal display panel 21 and push button type switches 31 and 32 are provided upon the upper face of the camera main body 12 at the side opposite to the switches 18 to 20. These switches are photographing magnification presetting switches in the automatic zoom mode and are zoom-up and zoom-down switches respectively in the manual zoom mode. That is, when the switch 31 which is the zoom-up switch is pressed in the manual zoom mode, the zoom lens is driven in such a direction that the focal length is increased. When the switch 32 which is a zoom-down switch is pressed in this mode, the zoom lens is driven in such a direction that the focal length is decreased.

Figure 5:
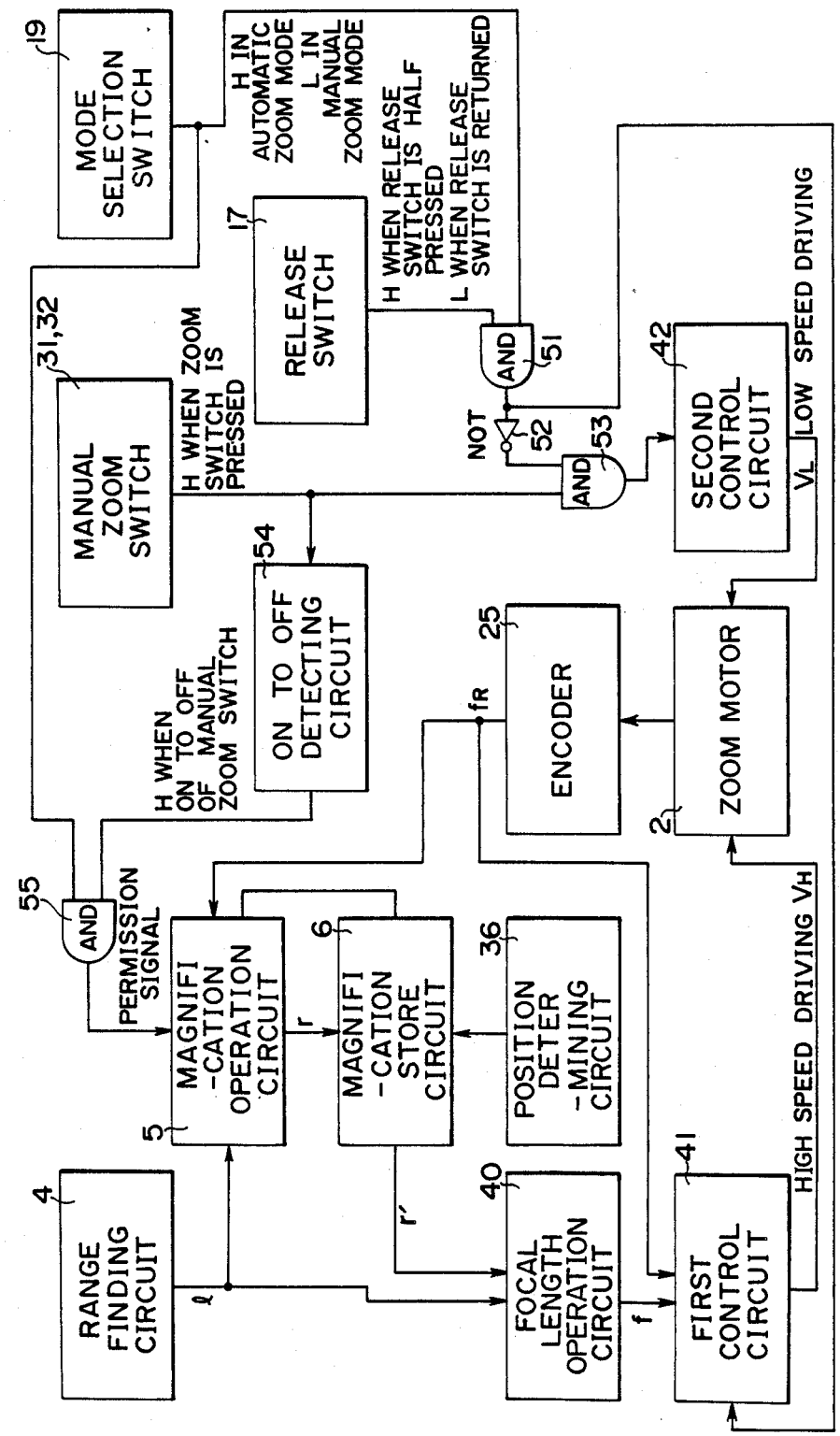
FIG. 5 is a block diagram showing another embodiment of a driving control circuitry of a powered zoom camera of the present invention.

Referring now to FIG. 5, there is shown a control circuit for controlling a powered zoom camera of the present invention. The control circuit mainly comprises a circuit for executing the automatic zoom mode in which a constant ratio of the size of the object image on a focal plane to the size of the photographic frame that is, the photographing magnification is maintained, a circuit for executing the manual zoom mode in response to the actuation of the manual zoom switches 31 and 32, a mode selection circuit 19 for selecting one of the two zoom modes and a circuit for presetting a photographing magnification which determines the ratio of an object image size to a photographic frame size.

The automatic zoom mode executing circuit comprises a range finding circuit 4 for determining the distance between an object and a camera lens form a signal received via the range finding window 16a on the front face of the camera, a circuit 40 for calculating the focal length of the zoom lens upon basis of the measured distance l from the range finding circuit 4 and the photographing magnification r from the magnification store circuit 6 and a first control circuit 41 for rotating a zoom motor at high speed to change the focal length of the zoom lens in response to a signal output from the focal length operation circuit 40 and a signal output from an encoder 25, representative of the focal length of the zoom lens.

The first control circuit 41 supplies the zoom motor 2 with driving pulses having a high duty cycle or a direct current VH for enabling the zoom motor 2 to be driven at a high speed.

The manual zoom mode executing circuit comprises the manual zoom switches 31 and 32 disposed on the upper face of the camera and a second control circuit 42 for rotating the zoom motor 2 at a low speed in response to signals from the switches 31 and 32. For example, when the switch 31 is pressed, the zoom motor 2 is rotated in a normal direction to perform zoom-up. That is, the focal length of the zoom lens is extended to increase the ratio of the size of the image of the object to the frame. On the other hand, when the switch 32 is pressed, the zoom motor 2 is rotated in the reverse direction to perform zoom-down. The focal length of the zoom lens is shortened to decrease the ratio of the object size image to the frame size. At this time, the second control circuit 42 supplies the zoom motor 2 with pulses VL having a low duty cycle to drive the zoom motor 2 at a low speed so that photographer can carry out a slow zooming.

The photographing magnification presetting circuit comprises the encoder 25 secured to a predetermined lens group of the zoom lens, for example a focus variable lens group, magnification operation circuit 5 for calculating the photographing magnification r from the focal length $f_R$ of the zoom lens output from the encoder 25 and a range finding signal l obtained from a signal received through the range finding window 22a and a magnification store circuit 6 for storing the magnification in accordance with a signal from the calculating circuit 5. Calculating of the photographing magnification r in the operation circuit 5 and storing of the magnification in the store circuit 6 is executed only when an enabling (i.e. "permission") signal which will be described hereinbelow is inputted.

Operation of the present zoom camera will now be described.

When the manual zoom mode is selected by means of the mode selection switch 19, an L level signal is outputted from the mode selection circuit 19. Since the release switch 17 is not pressed at this time, and an L level signal is also outputted from the release switch 17. Accordingly, the output of an AND gate 51 is also an L level. This output is reversed by the following NOT gate 52 so that the NOT gate 52 outputs an H level signal. When the manual zoom switch 31 or 32 is pressed at this time, the output of the AND gate 53 becomes the H level to operate the second control circuit 42 enabling manual zooming responsive to operation of the zoom switches 31, 32. Since the output of the AND gate 51 is at the L level, the operation of the first control circuit 41 is prohibited. Upon release of the switches 31, 32, the change of the switches from ON to OFF is detected by ON to OFF switching detector 54, which outputs an H level signal. Since an L level signal is outputted to the other input terminal of the AND gate 55, an H level permission signal is not outputted from the gate 55.

Since the release switch 17 is not pressed when the output of the circuit 19 is at the H level when the mode selection switch 19 selects the automatic zoom mode, the output of the AND gate 51 is L level, which is then inverted into H level at the output of the NOT gate 52, which is then outputted to other terminal of the AND gate 53 as an H level signal. Since the output of the AND gate 51 is an L level, the first control circuit 41 does not operate. When the manual zoom switch 31 or 32 is pressed, the output of the AND gate 53 becomes H level, enabling the zoom motor 2 to operate at a low speed as is done similarly to manual zoom mode. At this time, a signal representative of a focal length $f_R$ of the zoom lens is input to the photographing magnification operation circuit 5. The photographer releases the manual zoom switch 31 or 32 when the image of the object (for example, a person) occupies the frame at a suitable ratio, for example the image having full length of a person occupies the full vertical dimension of a frame (the photographing magnification is 1:1). At this time, the output of the ON to OFF detecting circuit 54 becomes H level and two H level signals are input to the AND gate 55. An H level permission signal is outputted from the AND gate 55. The current photographing magnification is calculated in the circuit 5 and the calculated magnification is stored in the store circuit 6.

When the release switch 17 is half pressed, the output of the AND gate 51 becomes H level and an L level signal is input to the second control circuit 42 through inverter 52 and gate 53. Accordingly, manual zoom mode is prohibited. On the other hand, an H level output signal from the AND gate 51 is inputted to the first control circuit 41, enabling following automatic zoom operation. A measured distance value l and the desired photographing magnification r which has been stored by the previous operation are input to the focal length calculating circuit 40 where the focal length f is calculated. A signal representative of the calculated focal length f is inputted to the first control circuit 41. In response to such input signal and the current focal length value $f_R$ from the encoder 25 the first control circuit 41 drives the zoom motor 2 at a high speed. The camera is automatically zoom-controlled in such a manner. The image of an object (full length of a person) is constantly imaged upon the focal plane even when the object approaches toward or moves away from the camera. If the camera is a still camera, the release switch 17 is fully pressed to take a picture. If the camera is a movie camera or video camera, the release switch is continued to be pressed for a suitable period of time.

If it is desired that the photographing magnification be changed to an other magnification, for example, it is desired that the full length of a person be changed to a half length of a person, the release switch 17 is returned. The output of the AND gate 51 becomes an L level so that the first control circuit 41 becomes disabled and the output of NOT gate 52 becomes the H level. When the manual zoom switch 31 or 32 is pressed at this time, the output of the AND gate 53 becomes H level, enabling the manual zoom operation. That is, manual zooming is conducted to shorten the focal length until the half length of a person may be viewed through a view finder. Manual zoom switch 31 or 32 is released when the half length of a person is obtained, the output of ON to OFF detection circuit 54 becomes H level so that a permission signal is outputted from the AND gate and the photographing magnification is calculated at this time. The calculated value is newly stored in the store circuit 6. Such an operation makes it possible to change the photographing magnification.

An output of a circuit 36 which determines the position of the camera is inputted to the first control circuit 41 through the magnification operation circuit 5 the magnification store circuit 6 and the focal length operation circuit 40 so that the ratio of the object image size on the focal plane to the frame size is not changed even when the position of a camera is changed.

Figure 6:
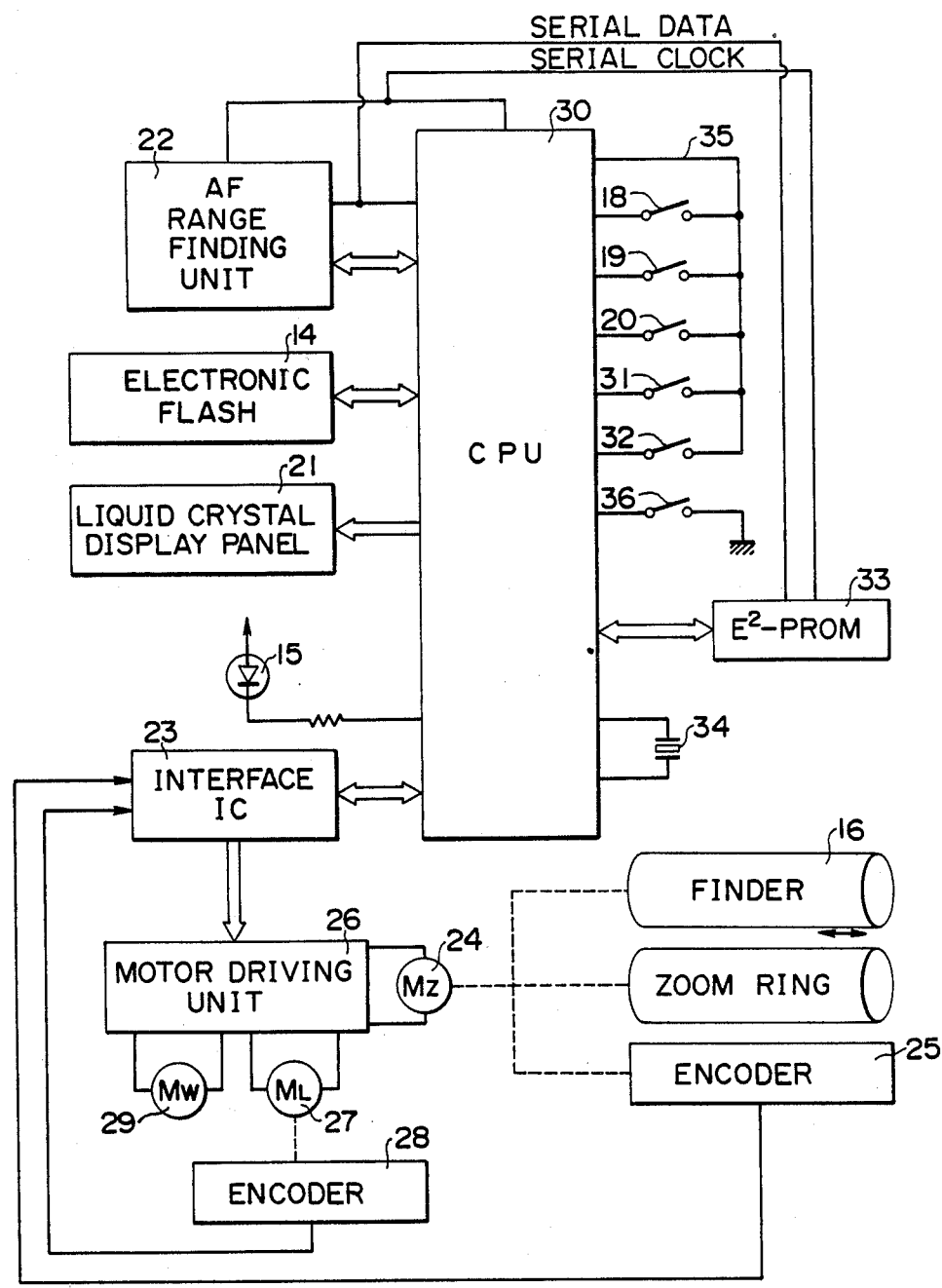
FIG. 6 is a block diagram showing an embodiment of an electronic circuitry of a powerd zoom camera of the present invention.

Referring now to FIG. 6, there is shown an embodiment of an automatic zoom camera of the present invention. An AF (automatic focussing) rangefinding unit 22 is independent from the other blocks and initiates range finding in response to an instruction of CPU 30. When the range finding is terminated, a range finding termination signal is fed to the CPU 30. The CPU 30 receives the range finding termination signal to feed serial clocks to the AF range finding unit 22. In response to this, range finding data are read into the CPU 30 from the AF range finding unit 22 to terminate the AF range finding operation.

The electronic flash 14 initiates charging in response to a signal from the CPU 30. When the charging of the electronic flash 14 is terminated, CPU 30 detects this to provide a charging stopping signal to the electronic flash 14. Subsequent flash light emission of the electronic flash 14 is carried out in response to a signal from the CPU 30. A ceramic oscillator 34 generates basic clocks for the CPU 30.

Change-over switches 18, 19 and 20 are connected to the CPU 30. The switch 18 is adapted to preset a self mode, the switch 19 is adapted to change the photographing mode into any one of manual zoom mode and automatic zoom mode. The switch 20 is adapted to set the electronic flash 14 to one of the modes including automatic light emission, prohibition of light emission and forced light emission. The modes which are selected by these change-over switches 18 through 20 are displayed on a liquid crystal display panel 21. A light emitting element 15 including an LED lights to indicate the self mode.

The switches 31 and 32 are zoom-up and zoom-down switches respectively. In both manual and automatic zoom modes, when the zoom-up switch 31 is pressed, the zoom lens is moved in such a direction that the focal length becomes longer and when the zoom-up switch 31 is pressed, the zoom lens is moved in such a direction that the focal length becomes shorter. Manual zooming is possible when the manual zoom switch 31 or 32 is pressed in an automatic zoom mode. The photographing magnification r at the time of termination of manual zooming is determined from the measured distance and the zoom lens position. The photographing magnification r is stored in a memory of the CPU 30.

Turning on or off of the switches 18, 19, 20 and the zoom switches 31, 32 is allowed only when the switch input state control line 35 of the CPU 30 is brought into an L level in sychronization with turning on of the power switch (not shown). A switch 36 which detects the attitude or position of the camera is connected to the CPU 30. That is whether the camera body is in a normal horizontal position in which the longer sides of a frame are horizontal or is in a vertical position in which the longer sides of the frame are vertical is detected by the switch 36 and is determined by the CPU 30.

When the release switch 17 is half pressed while the automatic zoom mode is selected by the turning on of the mode selection switch 19, the CPU 30 calculates the focal length f in accordance with the formula (1) based on the stored photographing magnification r and drives the zoom motor 24 via a motor driving unit 26 including an interface IC 23 which is also used as AE (automatic exposure) photometric unit and a bridge circuit. Since the position of the zoom lens which is moved by the zoom motor 24 is fed back to the CPU 30 via the interface IC 23 by means of an encoder 25 including a photointerrupter and the like, the CPU 30 can control the zoom motor 24 upon the basis of information from the encoder 25. Since the magnification in a finder 16 is changed in an interlocked manner with the zoom motor 24, a photographer can confirm the actual image size in the frame by viewing it through the finder 16. In the automatic zoom mode, the photographing magnification r can be changed by pressing the zoom-up switch 31 or zoom-down switch 32. The photographing magnification can be preset again by releasing these switches.

The lens motor 27 is driven in a normal direction via the interface IC 23 and the motor driving unit 26 to move the objective lens to a position at which a focal point which is calculated in accordance with the measured distance from the AF range finding unit 22 is obtained. In this case, the position of the zoom lens is also controlled by being fed back to the CPU 30 via the interface IC 23 by means of the encoder 28. Thereafter the shutter is operated to carry out exposure by reverse driving of the lens motor 27 when the release button is fully pressed. Then a film is wound by a wind motor to terminate a series of operations.

Variations of lens position, zoom constants, etc. should be considered when the AF range-finding data are converted into the lens position data. Since these values are stored in $E^2$-PROM 33 as adjusting data when the camera is produced, CPU 30 can calculate a precise lens position from the AF range finding data and the data in $E^2$-PROM 33. Since the interface IC 23 is intrinsically a photometric IC, the CPU 30 conducts shutter control upon the basis of photometric value of the interface IC 23. In this case, $E^2$-PROM stores an error of a the photometric value. The CPU 30 calculates a correct exposure time from the photometric data and the data in the $E^2$-PROM 33. Writing and reading of data into and from $E^2$-PROM 33 is conducted in a serial manner and their state control is conducted between $E^2$-PROM 33 and the CPU 30 via direct lines.

Operation of the present embodiment will be described with reference to flow charts in FIGS. 7 and 8.

Figure 7:
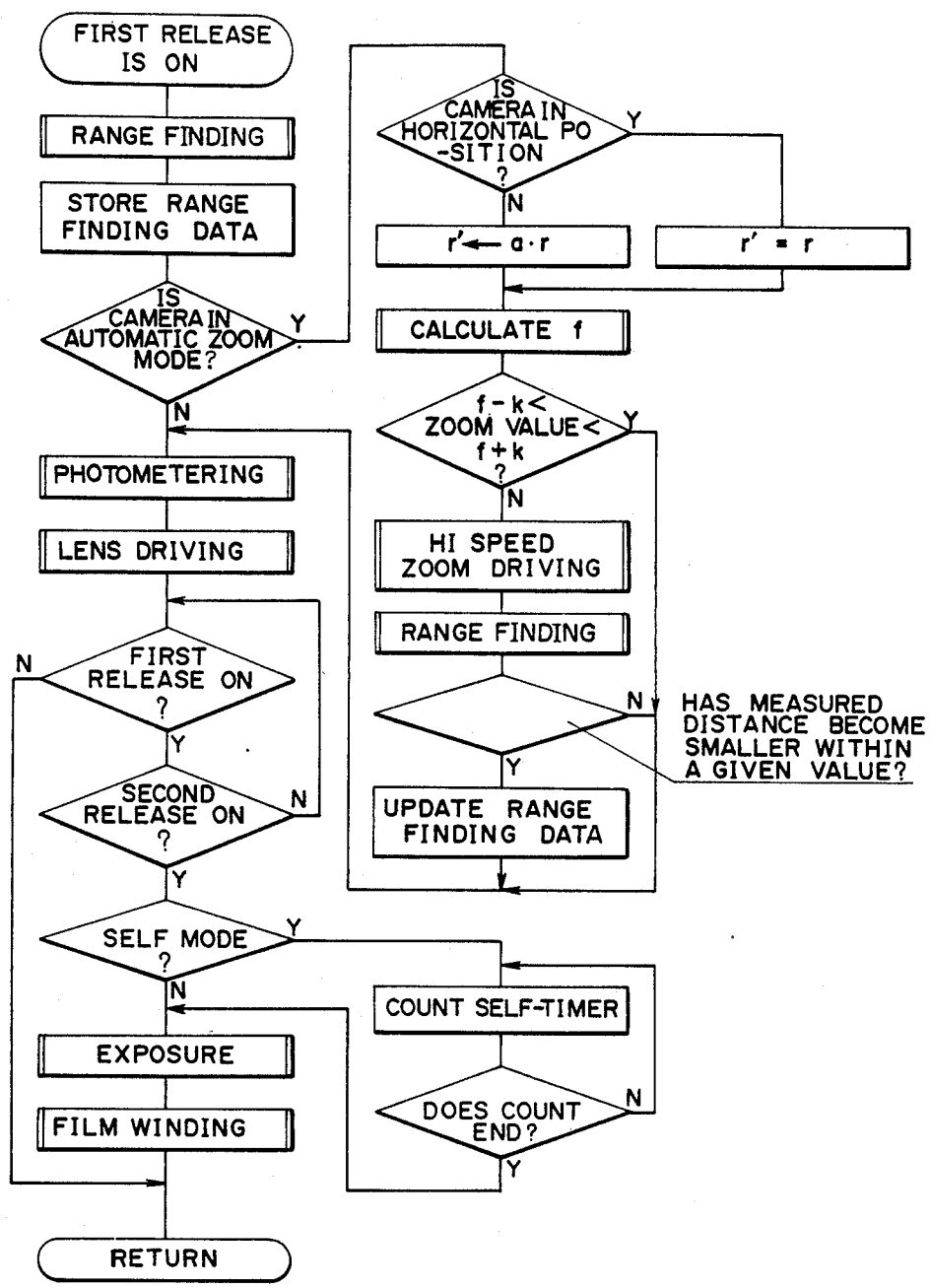
FIGS. 7 to 11 are flow charts for explaining the operation of the camera shown in FIG. 6.
Figure 8:
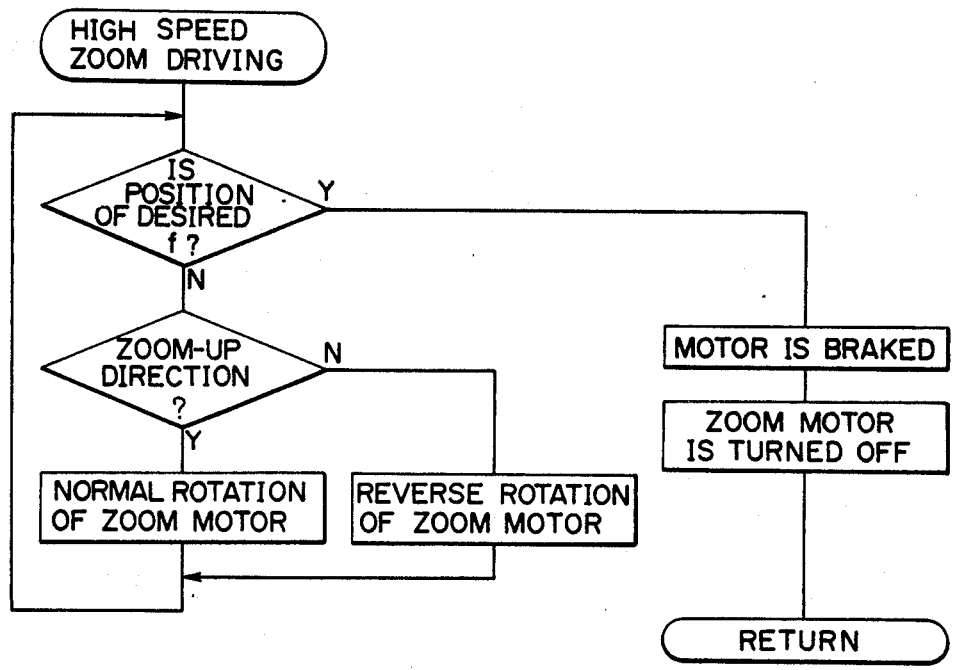

When the release switch is half pressed to turn a first release on as shown in FIG. 7, the program is immediately changed to a sub-routine of range finding. In the range finding subroutine, a distance l between an object and the camera is determined by conducting range finding operation in AF range finding unit 22. The data of the range finding result are stored, and then a check of whether the camera is in the automatic zoom mode or not is performed. If it is not in the automatic zoom mode (that is, it is in the manual zoom mode), photometering is conducted by means of the interface IC 23. Then the objective lens is driven to move to a focussed position upon the basis of an object distance which is a range finding datum and the first release is rechecked and the second release is checked. If the release switch 17 is fully pressed to turn the second release on, a check of whether or not the camera is in the self mode is performes. If the camera is not in the self mode, exposure is conducted by executing a subroutine for exposure and then the film is wound to terminate this program. If the camera is in the self mode, self timer is counted and after the termination of the count, the subroutine for exposure is executed.

If the automatic zoom mode is selected by turning on of the mode selection switch 19, a check of whether the camera is in the horizontal position or in the vertical position is performed. The camera is usually used in a horizontal position. If the camera is initially released in the horizontal position, the photographing magnification r which has been preliminarily stored in the CPU 30 by the operation of the zoom switch 31 or 32 before the release as will be described hereafter is stored as new photographing magnification r' without changing it. If the camera is firstly released in a vertical position, the photographing magnification r which has been stored in the CPU 30 is multiplied with a constant a and the result is stored as new photographing magnification r'.

The reason why the photographing magnification r which has been stored in the CPU 30 is multiplied with a constant a if the camera is in a vertical position will be described. The constant a is preset as a value 1.4 to 1.5. The value of the constant a is a ratio of shorter sides to longer sides of a frame, that is, the ratio of shorter dimension to longer dimension of a frame for a photographic paper or 35 mm film. In other words, since the shorter dimension of a photographic paper is assumed as 1, the longer dimension would be 1.4, so that a=1.4/1=1.4. Since the shorter dimension of a frame for a 35 mm film is 24 mm and the longer dimension is 36 mm, a=36/24=1.5. The camera is usually used in a horizontal position in which the longer sides of a frame are aligned horizontal. Assuming that a portrait be photographed, for example, a bust be photographed, it is preferable that the ratio of the size of the image of a person to be photographed with respect to the size a frame be constantly the same even when the camera is changed from the horizontal to vertical position. In other words, the ratio of the vertical dimension of the image of the person to the dimension of the frame would be changed between the horizontal and vertical positions even if the same photographing magnification r is preset. If the image which is a fold larger in dimension than that in the horizontal position is formed when the camera is in the vertical position, the ratio of the vertical dimension of the person to be photographed to the vertical dimension of the frame can be always constant in both vertical and horizontal positions. The photographing magnification r which is stored in the CPU by the operation of the manual zoom switches 31 and 32 is based on the value obtained in the horizontal camera position.

After the new photographing magnification has been preset, a subroutine for calculating the focal length f based on the photographing subroutine is executed. That is, the focal length f is calculated from the photographing magnification r' and the object distance l which is a AF range finding data in accordance with the formula (1). The subroutine of the calculation of the focal length f will be described hereafter with reference to FIG. 11. Then the zoom value which is a current focal length is compared with the focal length of the target position of the automatic zooming which is determined by the afore-mentioned calculation. If the current zoom value is substantially the same as the desired focal length f, it is determined that the lens has already been in the desired automatic zoom position and the program jumps to a photometry subroutine by omitting the next zoom driving process. The allowance (f±k) of the determination that the current zoom value is substantially the same as the desired focal length f may be, for example, ± one pattern of the zoom encoder 25 or several percents of an error between the photographing magnification and the stored value. In short, an allowance which users can hardly recognize even if the zoom lens is moved is preset so that the time lag in shutter releasing is shortened as short as possible. If the first release is conducted immediately after the photographing magnification r is preset, the next zoom driving is not conducted so that a shutter chance is not lost since the object is not moved.

If the current zoom value is different from the focal length by ± k, the zoom motor 24 is driven at a high speed to shift the zoom position to the desired focal length f. That is, high speed automatic zoom driving is conducted. In this high speed automatic zoom driving, it is checked to determine whether or not the zoom lens is in a position corresponding to the desired focal length f as shown in FIG. 8. If the zoom lens is in a position of desired focal length f, the zoom motor 24 is braked and the motor is then turned off and the program returns. If the zoom lens is not in a position of desired focal length, the motor 24 is driven in a normal direction when the zoom lens is to be moved in a zoom-up direction. The motor 24 is driven in a reverse direction when the zoom lens is to be moved in a zoom-down direction. Range finding is conducted again after this zoom lens driving. The purpose of the range finding is to check whether an object approaches the camera during zoom lens driving. In other words, the object may move out of the depth of field during zoom driving if the object moves fast or the object is close to the camera even when the zoom lens is moved at a high speed. Accordingly rerange finding is conducted so that the zoom lens can be focussed to an update position even in such a case. The result of range finding is checked to determine whether measured distance data or the object distance l becomes shorter within a given value. Measured distance data are updated only when the object distance l has become shorter within a given value.

The reason why the distance l is updated only when the object approaches toward the camera will now be set forth. Since the camera is in an automatic zoom mode, most of the object is a person. When a portrait is photographed, the person to be photographed faces toward the camera unless shooting an artistic photograph. Accordingly, if the person moves, he moves toward the camera in most cases. For example, when a camera is aimed at a child, he or she will usually approach the camera. Although a picture of a bridal pair entering a wedding is taken, a picture of the pair leaving the wedding is seldom taken. Even if a focus is wanted to be locked during zoom driving, a person closest to a camera is mostly focus-locked in portrait photographing. Simply adopting the measured distance data which are obtained after zoom driving may result in shifting of the focused lens into an out-of-focus position. The measured distance data assume a long distance if a person to be photographed is out of a range finding zone. Such measured distance data are not adopted. That is, it is best to determine that an object has approached only when the newly measured distance is shorter than previously measured distance. Since the object is a person, the object does not approach unlimitedly fast. Accordingly a person who runs 100 mm in 10 seconds can be preset as the fastest person. Therefore a value which is determined by the following formula:

$$\text{zoom driving time} \times 100 \text{ m}/10 \text{ sec.} \quad (3)$$

can be preset as a criterion for determining whether or not a person approaches within a given value.

Thereafter photometering is conducted as is similar to the case of the afore-mentioned manual zoom mode. Then the objective lens is driven to move to a focussed position in accordance with the measured distance data and the second release is checked. When the release switch is fully pressed to turn the second release on, the subroutine of exposure is immediately executed if the camera is not is self mode. if the camera is in self mode, the exposure subroutine is executed to wind the film at the time when counting of the self timer has been terminated.

Figure 9:
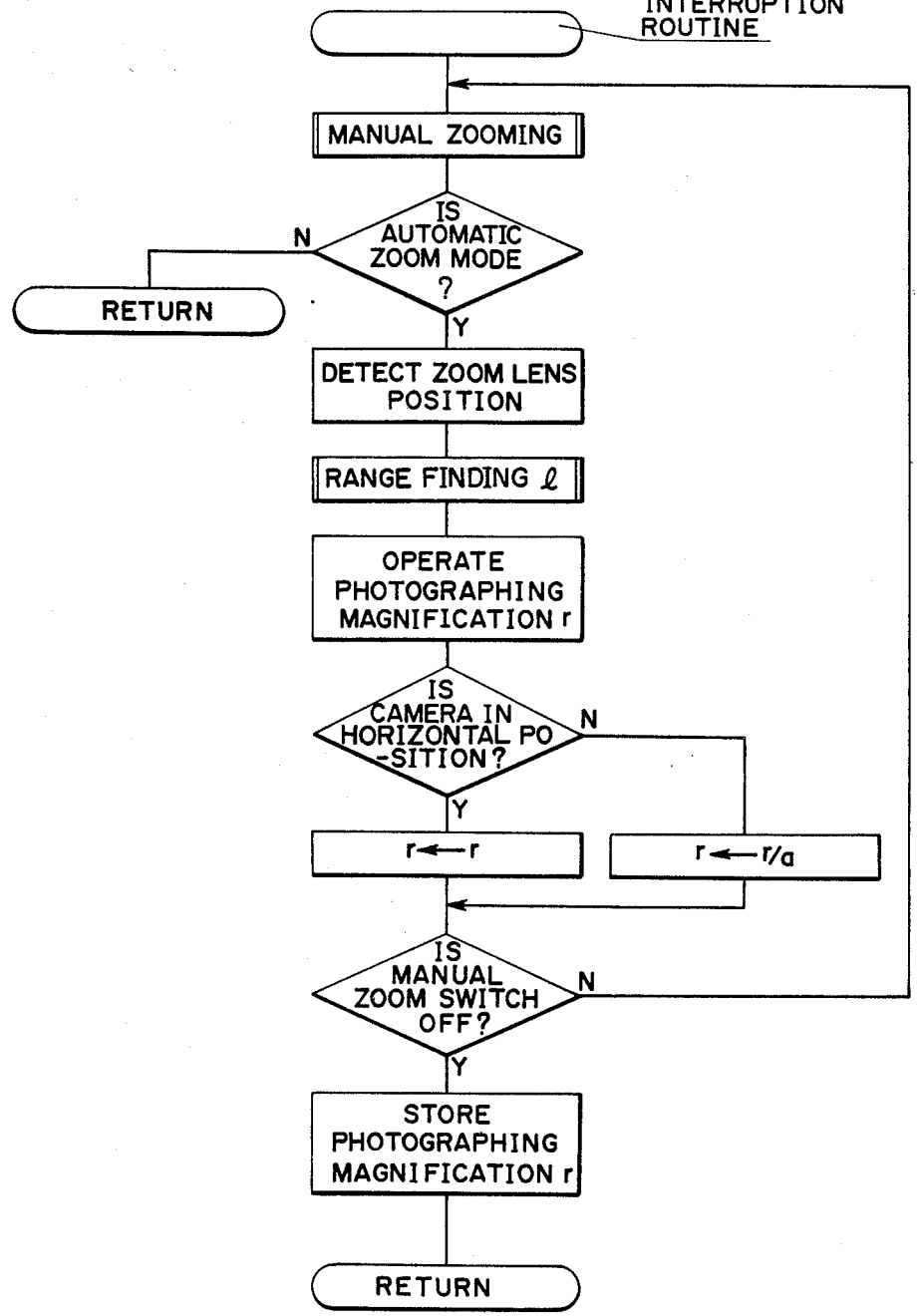

When the zoom-up switch 31 or the zoom-down switch 31 is pressed in the automatic zoom mode, an interruption subroutine for presetting a photographing magnification r as shown in FIG. 9 is executed. The zoom switch 31 or 32 is pressed to obtained a desired photographing magnification r prior to pressing of the release switch. When the program proceeds to the interruption routine of the switch 31 or 32, a subroutine for manual zooming is first executed. Details of the subroutine of the manual zooming will be described hereafter with reference to FIG. 10. The zoom lens is moved in such a direction that the focal length becomes longer while the zoom-up switch 31 is pressed. The zoom lens is moved in such a direction that the focal length becomes shorter while the zoom-down switch 32 is pressed. Zooming is terminated when the switches 31 and 32 are turned off. After the execution of the subroutine for manual zooming, it is checked whether the camera is in an automatic zoom mode. If the camera is not in the automatic zoom mode, the processing is terminated. If the camera is in the automatic zoom mode, the photographing magnification r is then calculated and is stored in the CPU 30. That is, range finding is conducted to determine a current object distance l at the time when the manual zooming has been terminated. Thereafter the photographing magnification r is calculated from the distance l and the current zoom value f in accordance with the formula (2). Thereafter the camera position is checked. If the camera is in the horizontal position, the calculated photographing magnification is stored in the CPU 30 as it is. If the camera is in the vertical position, the calculated photographing r is divided by a constant a and the quotient is stored as the photographing magnification. In short a magnification which has been converted into a photographing magnification r in the horizontal position is stored in the CPU 30 even if the camera is in the vertical position.

If zooming to a desired zooming position is conducted by operating the zoom switch 31 or 32 in the automatic mode in such a manner, a photographing magnification r which has been determined from a range-finding data after zooming and the focal length value is stored in the CPU 30. If the release switch 17 is then pressed, the lens is automatically zoomed to a zoom position at which the stored photographing magnification r is obtained. The photographing magnification r will not change unless the zoom switch 31 or 32 is operated again. Accordingly a picture is taken by using the same photographing magnification r on each release. If a change in photographing magnification is desired, the zooming is conducted again until a zoom position at which a desired photographing magnification is obtained. The stored photographing magnification r is converted into the magnification obtained in the horizontal position of the camera. An actual photographing magnification r′ which is obtained in the vertical position of the camera is a fold of the stored photographing magnification r.

Figure 10:
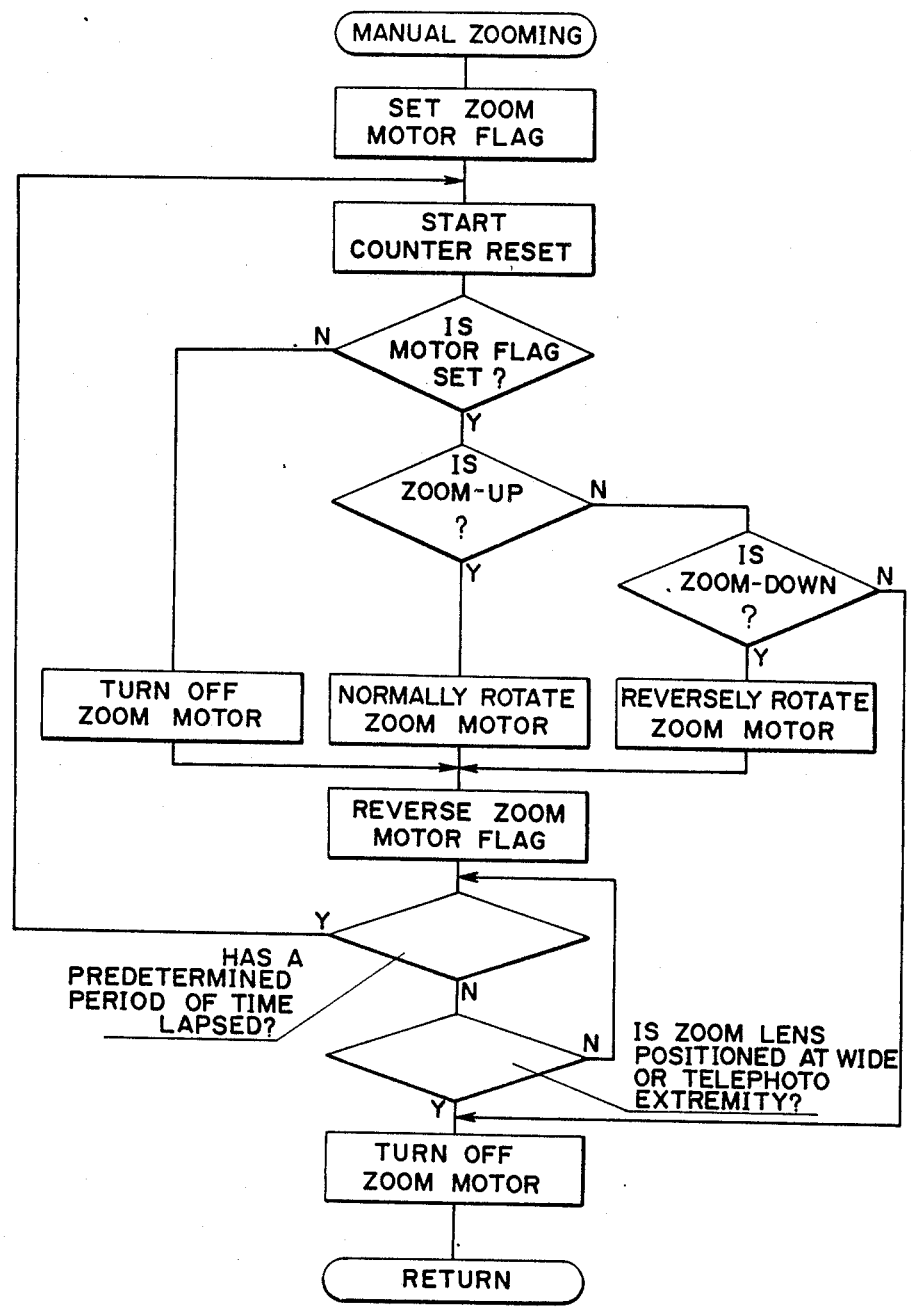

The subroutine of the manual zooming in FIG. 9 is shown in FIG. 10. If the camera is in the manual zoom mode and the zoom-up switch 31 or the zoom-down switch 32 is pressed, the main routine is interrupted and the program shifts to the flow of manual zooming shown in FIG. 10. Driving of the zoom motor at this time is conducted at a lower speed than in the automatic zoom mode as will be described hereafter. A motor flag is first set. Setting and resetting of the motor flag represents turning ON and OFF of the zoom motor 24 respectively. Then the timer counter is reset and started. The counts of the counter are used for determining the lapse of a given period of time. When the zoom-up switch 31 is pressed, the zoom motor 24 is rotated in a normal direction to extend the zoom lens. When the zoom-down switch 32 is pressed, the zoom motor 24 is reversly rotated to retract the zoom lens. Normal or reverse rotation of the zoom motor 24 continues until the motor flag is reversed, and the timer counter counts a given period of time or the zoom lens reaches a short or long focal length extremity. For example, after the normal rotation of the zoom motor 24 has continued for a given period of time, the timer counter is reset and started again and the motor flag is checked. Since the motor flag is reset by the reversing of the motor flag, the zoom motor 24 is turned off. The motor flag is reversed again and the above mentioned operation is repeated after the lapse of a given period of time. Motor driving for zooming-up is conducted by driving pulses having a 50% duty cycle. Motor driving for zoom-down is also conducted by pulse driving. The duty cycle for pulse driving is not limited to 50% and may be changed to any desired value depending upon needs. The driving frequency may be similarly changed. When the encoder 25 confirms that the zoom lens has reached the short or long focal length extremity, or both switches 31 and 32 are turned off, the zoom motor 24 is turned off and the program will return to the main routine.

Figure 11:
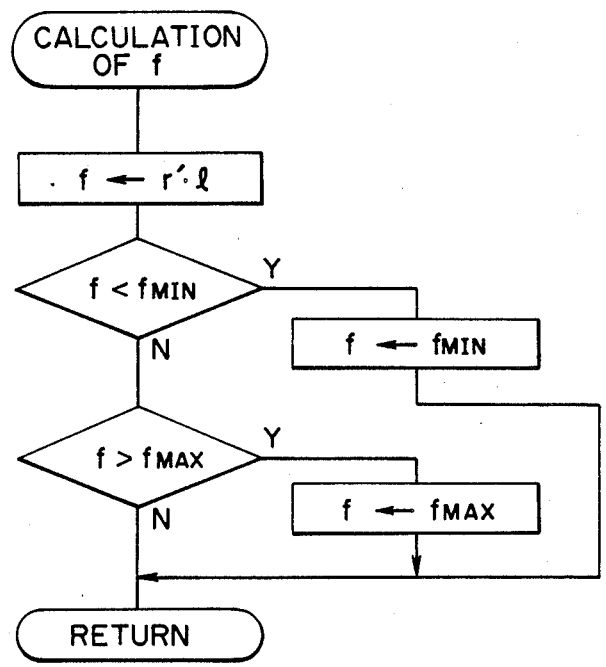

Referring now to FIG. 11, there is shown a subroutine of the calculation of the focal length f shown in the flow chart of FIG. 7. A focal length f is calculated from the preset photogragping magnification r' and an object distance 1 which is an AF range finding datum. The calculated focal length f is fixed to a minimum value $f_{MIN}$ of the zoom lens if the former is less than the latter. The calculated focal length f is fixed to a maximum value $f_{MAX}$ of the zoom lens if the former is larger than the latter. In case of $f_{MIN} \leq f \leq f_{MAX}$, the calculated focal length f is adopted as it is. The reason why this measure is taken is that it is impossible to move the zoom lens beyond these maximum or minimum focal lengths when an object is too close or too far. In such a case, an alarm indication may be carried out by a liquid crystal display panel 21 and alarm sound may be generated by using a ceramic sound generating element.

Figure 12:
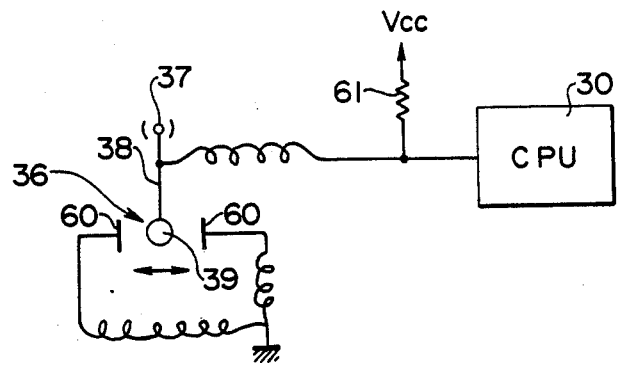
FIGS. 12 and 13 are electric diagrams showing the structure and operation of a switch for detecting the camera position.
Figure 13:
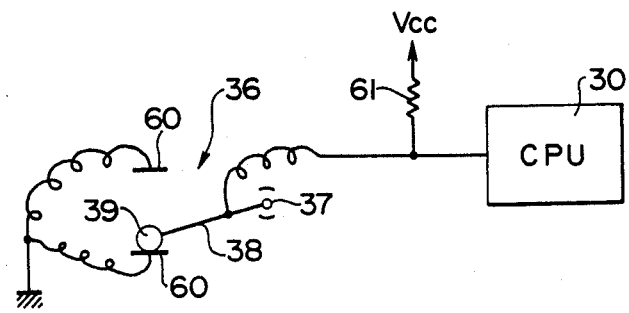

Referring now to FIGS. 12 and 13, there are shown details of the switch 36 for detecting the position of a camera. The switch 36 comprises an electrically conductive ball 39 which is suspended from a support 37 by means of an electrically conductive wire 38 and electrically conductive members 60 disposed around the ball 39. The elecrically conductive wire 38 is connected to an input port of the CPU 30 and is connected to a power source through a resistor 61. The members 60 are grounded.

When the camera is in a normal horizontal position, the switch 36 is turned off since the ball 39 which is supended by gravity is not in contact with the conductive members 60. Accordingly the input port of the CPU 30 is at the "H" level. When the camera is in the vertical position, the switch 36 is turned on since the ball 36 is in contact with the conductive member 60 as shown in FIG. 13. Accordingly, the input port of the CPU 30 is at the L level so that the vertical position of the camera is detected.

in accordance with the present invention, a photographing magnification of an object to a photographic frame can be freely preset on automatic zooming. A photographer can preliminarily confirm the dimension of an object through a finder when a photographing magnification is preset. When the photographing magnification is desired to change in the automatic zoom mode, the photographing magnification can be immediately changed to a desired value as is similarly to manual zooming.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. A powered zoom camera comprising:
   a zoom lens;
   mode selecting means for selecting one of a manual zoom mode in which the focal length of the zoom lens is manually selected by the actuation of an actuation member disposed so as to be accessible from the exterior of the camera and an automatic zoom mode in which a magnification of the size of the image of an object to be photographed on a focal plane of the camera with respect to the size of a film frame is kept constant in response to a distance or range between the object and the camera lens; and
   lens drive control means for operating the zoom lens at a low speed when the manual zoom mode is selected and for operating the zoom lens at a high speed when the automatic zoom mode is selected.

2. A powered zoom camera as defined in claim 1 and further including operational means for calculating the focal length of the zoom lens based upon the measured distance or range between the object and the camera lens and a desired magnification of the size of the image of the object on the focal plane with respect to the size of the photographic frame adapted to be placed at the focal plane.

3. A powered zoom camera as defined in claim 2 in which said lens drive control means comprises a zoom motor for changing the focal length of the zoom lens;
   a first control means operative when said mode selecting means selects the automatic zoom mode for driving the zoom at a high speed in response to a signal from said operational means; and
   a second control means operative when said mode selecting means selects the manual zoom mode for driving the zoom lens at a low speed in response to a signal from said external actuation member.

4. A powered zoom camera comprising:
   a zoom lens;
   an actuating means disposed along the outer surface of the camera and accessible from the exterior of the camera;
   means for presetting a desired magnification of the size of the image of an object to be photographed on a focal plane with respect to the size of a photographic frame adapted to be disposed at said focal plane; and
   mode selecting means for selecting either one of a manual zoom mode in which the focal length of a zoom lens is manually selected by the actuation of said actuation means and an automatic zoom mode in which a magnification of the size of the image of an object to be photographed on a focal plane with respect to the size of a photographic frame is kept constant in response to a distance between the object and the camera lens whereby the camera is brought into the manual zoom mode on actuation of the actuating member while the automatic zoom mode is selected and the magnification r is preset in accordance with the focal length of the zoom lens at the time when the actuating member is released.

5. A powered zoom camera as defined in claim 4 in which said magnification presetting means comprises encoding means for providing a signal representative of the focal length of the zoom lens; and operational means for calculating the magnification in accordance with the measured distance and the signal from said encoding means in response to a permission signal generated when said selection means selects the automatic zoom mode and said actuating member is released; and means for storing the magnification calculated the operational means.

6. A powered zoom camera as defined in claim 5 and further including releasing means which enables automatic zooming after said permission signal is generated.

7. A powered zoom camera with a zoom lens having a constant magnification photographing function in which the zoom lens is driven to a predetermined focal length prior to photographing including range finding means for measuring the distance between an object to be photographed and the camera lens; an electric motor; said zoom lens having a focal length which can be changed by said electric motor; and means for determining the focal length of the zoom lens at which the desired magnification may be obtained based upon the information on distance or range between the object and the camera lens, measured by the range finding means, characterized in that said focal length determining means has two magnification determining processes and in that a magnification which is suitable for the camera position is automatically preset by detecting the camera position by camera position determining means incorporated in the camera and by selecting one of magnification determining processes.

8. A powered zoom camera as defined in claim 7 in which the frame is of a rectangular shape having long and short sides, the ratio of the dimensions of a long side to a short side being a:b, the magnification determining process at the time when the short sides of the frame are oriented in the vertical direction corresponds to one process and the magnification determining process at the time when the long sides of the frame are oriented in the vertical direction corresponds to the other process.

9. A powered zoom camera as defined in claim 8 in which the ratio of the magnification determined by one process to that determined by other process is substantially a:b.

10. The camera of claim 7 wherein said position determining means comprises switch means assuming a first switch position when the camera is oriented horizontally and a second switch position when oriented vertically.

11. The camera of claim 10 wherein said switch means is comprised of a pair of spaced-apart terminals and a movable terminal arranged between said spaced-apart terminals for electrically engaging one of said spaced-apart terminals when the camera is in one of the two orientations and being spaced from both of said spaced-apart terminals when the camera is in the remaining one of its orientations.

12. A powered zoom camera having a constant magnification photographing function including a range finding means for measuring the object distance from the camera, an electric motor, a zoom lens, the focal length of which can be changed by said electric motor, focal length presetting means for determining the focal length of the zoom lens at which a constant magnification is obtained from information of object distance, which is obtained from the range finding means, and drive means for driving the zoom lens motor to provide the determined focal length prior to photographing, comprising:

means for detecting and outputting the current preset focal length; determining means for comparing the output value of the focal length determining means and the current focal length setting of the lens and determining whether or not the difference therebetween exceeds a given value; and bypass means responsive to said determining means for omitting the driving of the zoom lens by the driving means when the difference is not greater than said given value.

13. A powered zoom camera having a constant magnification photographing function including a range finding means for measuring the object distance from the camera, an electric motor, a zoom lens, the focal length at which can be changed by said electric motor, focal length presetting means for determining the focal length of the zoom lens at which a constant magnification is obtained from information of object distance, which is obtained from the range finding means, and drive means for driving the zoom lens motor to provide the determined focal length prior to photographing, comprising:

means for remeasuring the object distance after the driving of the zoom lens by the driving means has been completed;

and means for comparing the second measurement with the initial measurement and for updating the measured distance data only when the second measurement is smaller than the initial measurement.

14. A method for operating a powered zoom camera having a zoom lens and including a release button movable to a first release position and means for selecting from a manual zoom operating mode and an automatic zoom operating mode, said method comprising the steps of:

(a) adjusting the size of the image to be photographed within the film frame located at the focal plane of the camera by moving said zoom lens;

(b) detecting the focal length of the zoom lens responsive to the presence of the automatic mode condition;

(c) determining the distance of the object being photographed from the camera lens;

(d) calculating a photographing magnification value (r) which is a function of the object distance and focal length and storing said value for subsequent use;

(e) repeating step (c) when the camera release button is depressed to said first release position;

(f) calculating the focal length value utilizing the distance value obtained after movement of the camera release button to the first release position and the previously stored value (r); and (g) moving the zoom lens to a position according to the calculated focal length value.

15. The method of claim 14 wherein step (f) further comprises the steps of:

comparing the calculated focal length with the focal length of the zoom lens and omitting the steps of moving the zoom lens when the focal length of the zoom lens in its present position differs from the calculated focal length within upper and lower predetermined limits.

16. The method of claim 14 wherein the speed of movement of the zoom lens during step (a) is less than the speed of movement of the zoom lens during step (g).

17. The method of claim 14 further comprising the step of:

(h) detecting the distance of the object being photographed from the camera lens after step (g);

(i) comparing the last detected distance with the previously detected distanced and repeating steps (f) and (g) when the last measured range distance is different from the first measured distance.

18. The method of claim 17 wherein the step of comparing the distance values further comprises the step of:

(j) repeating steps (f) and (g) only when the last measured distance is less than the previously measured distance.

19. The method of claim 14 further comprising the steps of:

determining the orientation of the camera; and
multiplying the photographing magnification value (r) by a predetermined value if the camera is oriented in a vertical direction or alternatively retaining the original photographing magnification value (r) in the event that the camera is oriented horizontally.

20. The method of claim 14 wherein step (a) is further comprised of:

initiating a count of elapsed time responsive to movement of the zoom lens; and halting movement of the zoom lens when the zoom lens reaches either of its extreme positions of movement.

21. The method of claim 14 wherein step (a) further comprises the steps of:

initiating the accumulation of elapsed time upon movement of the zoom lens;

halting movement of the zoom lens; and reinitiating movement of the zoom lens if the elapsed time count has not reached a predetermined value.

22. The method of claim 21 further comprising the step of reinitiating the accumulation of elapsed time.

23. The method of claim 22 further comprising the step of halting movement of the zoom lens when the zoom lens reaches either of its two end positions, namely the wide angle or telephoto positions.

24. The method of claim 14 wherein step (a) further includes the steps of:

initiating a count of elapsed time responsive to movement of the lens;

halting movement of the lens;

reinitiating movement of the lens if a predetermined interval of elapsed time has not been accumulated; and reinitiating said count of elapsed time.

* * * * *

UNITED STATES PATENT AND TRADEMARK OFFICE
CERTIFICATE OF CORRECTION

PATENT NO. : 4,942,417

DATED : July 17, 1990

INVENTOR(S) : Miyazawa et al.

It is certified that error appears in the above-identified patent and that said Letters Patent is hereby corrected as shown below:

```
Column 1, line 31, "moves away" should be --tracking--
Column 4, line 33, after "approaches" insert --or--
Column 5, line 17, "change" should be --changing--
Column 5, line 50, "form" should be --from--
Column 6, line 14, after "that" insert --a--
Column 7, line 37, "an other" should be --another--
Column 9, line 26, delete "a"
Column 9, lines 50-51, "performes" should be --performed--
Column 11, line 52, "100 mm" should be --100 m--
Column 11, line 67, "not is" should be --not in--
Column 14, line 1, "in" should be --In--
Column 15, line 21, after "calculated" insert --by--
Column 15, line 57, after "by" insert --the--
Column 16, line 30, "at" should be --of--
Column 17, line 19, "distanced" should be --distance--
```

Signed and Sealed this

First Day of October, 1991

Attest:

Attesting Officer

HARRY F. MANBECK, JR.

Commissioner of Patents and Trademarks